United States Patent [19]

Fujimoto et al.

[11] Patent Number: 4,792,742
[45] Date of Patent: Dec. 20, 1988

[54] CONTROL APPARATUS FOR AN INVERTER WITH SELF-ADJUSTMENT FUNCTION OF CONTROL CONSTANTS

[75] Inventors: Noboru Fujimoto, Hitachi; Toshiaki Okuyama, Tokai, both of Japan

[73] Assignee: Hitachi, Ltd., Tokyo, Japan

[21] Appl. No.: 46,157

[22] Filed: May 5, 1987

[30] Foreign Application Priority Data

May 9, 1986 [JP] Japan ................... 61-106469

[51] Int. Cl.$^4$ ............................. H02P 5/40
[52] U.S. Cl. ....................... 318/805; 318/800
[58] Field of Search ............. 324/158 MG; 318/798, 318/805, 806, 803, 807–811, 800

[56] References Cited

U.S. PATENT DOCUMENTS

| | | | |
|---|---|---|---|
| 4,423,367 | 12/1983 | Blaschke et al. | 318/805 |
| 4,442,393 | 4/1984 | Abbondanti | 318/805 |
| 4,510,430 | 4/1985 | Ashikaga et al. | 318/800 |
| 4,672,288 | 6/1987 | Abbondanti | 318/806 |

OTHER PUBLICATIONS

Fitzgerald et al., *Electric Machinery*, McGraw-Hill, 1952, pp. 415–419.
Deshpande et al, "A New Method of Determining Rotor Leakage Reactance and Resistance of a Three Phase Motor", Institution of Electrical Engineers, Paper No. 2757U, Feb. 1959.

*Primary Examiner*—David Smith, Jr.
*Attorney, Agent, or Firm*—Antonelli, Terry & Wands

[57] ABSTRACT

A motor current flowing through an inverter-driven induction motor is detected when voltage is applied to the induction motor by the inverter operated under a certain condition on the basis of the vector control. The detected current is converted to two components of a current vector in a d-q coordinate system. Motor constants are calculated on the basis of a component in the d-coordinate axis of a voltage reference set for creating the certain condition and the two converted components of the motor current detected at that time, and control constants in a vector control apparatus for the inverter-driven induction motor are set or adjusted in accordance with the calculated motor constants. According to this invention, the control constants in the vector control apparatus can be easily set or adjusted.

6 Claims, 5 Drawing Sheets

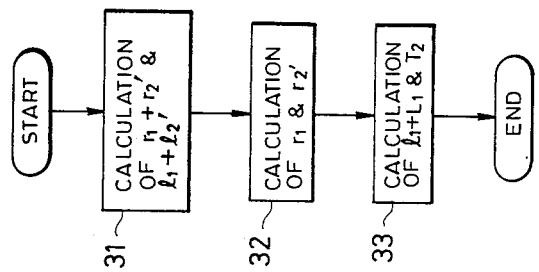
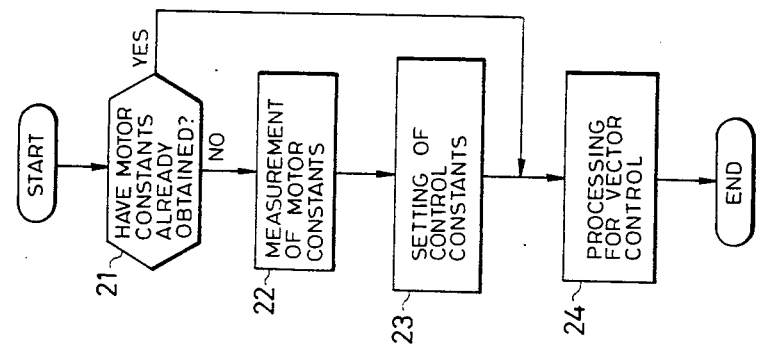

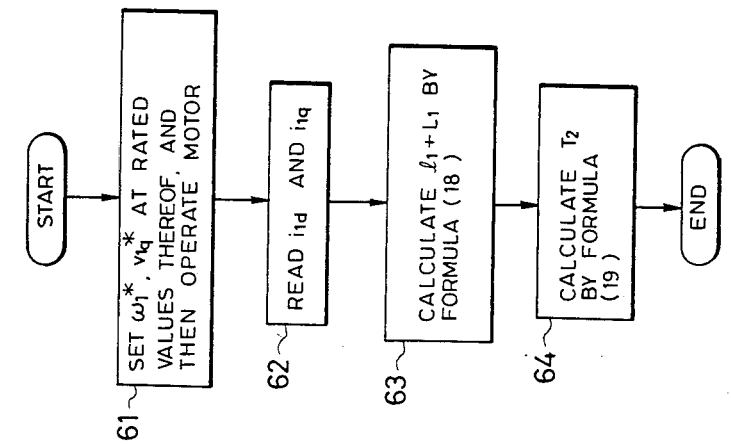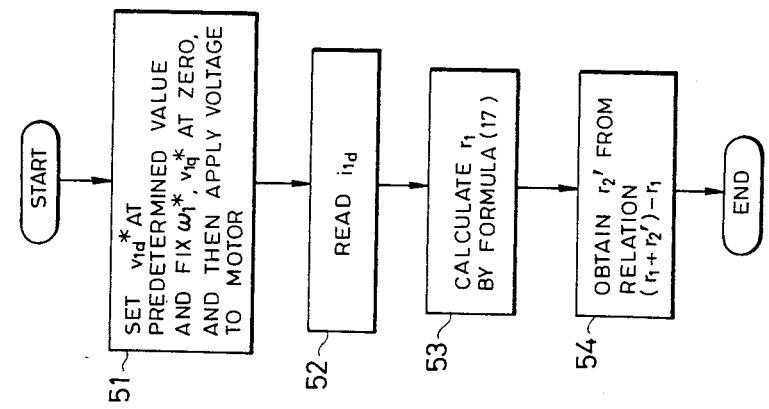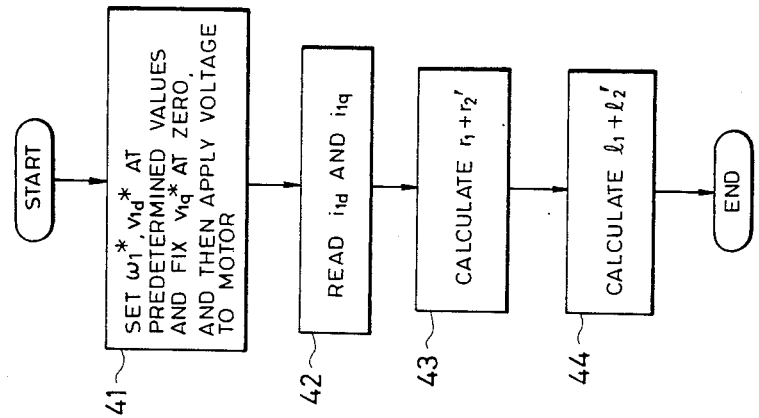

CONTROL APPARATUS FOR AN INVERTER WITH SELF-ADJUSTMENT FUNCTION OF CONTROL CONSTANTS

BACKGROUND OF THE INVENTION

1. Field of The Invention

The present invention relates to a control apparatus for an inverter which feeds an induction motor on the basis of a vector control, especially to an inverter control apparatus, in which various control constants necessary for the processing operation of the vector control can be adjusted by itself in response to constants of the induction motor fed by the inverter.

2. Description of The Related Art

Nowadays, an inverter-fed induction motor is often controlled on the basis of a so called vector control, in which a primary current of the induction motor is resolved into a torque current component and a magnetizing current component which are separately controlled independent of each other, so that the high performance speed control of the induction motor can be attained. In such vector control, various control constants to be set in an inverter control apparatus must be determined in response to constants of an induction motor fed from the inverter.

In vector oontrol apparatus disclosed in Japanese Patent Laid-open Publication Nos. 59-165982 (published on Sept. 19, 1984) and 61-52176 (published on Mar. 3, 1986), for example, motor constants, such as primary resistance, primary inductance, leakage inductance and secondary resistance, are utilized as control constants in those control apparatus in order to calculate reference signals for controlling the output voltage of an inverter.

Conventionally, the control constants are manually set in the control apparatus on the basis of designed values of the motor constants. Therefore, troublesome works are necessitated, because the control constants in a control apparatus must be changed whenever an induction motor associated with the control apparatus is replaced. Further, the disagreement between the designed values and actual ones of the motor constants results in error occuring in course of calculation of voltage reference signals, which causes the torque produced by the induction motor to fluctuate.

To resolve the aforesaid problems, there is provided a control apparatus as disclosed in Japanese Patent Laid-open Publication No. 61-92185. According to this apparatus, an induction motor is fed by an inverter which operates in accordance with a predetermined reference signal for a motor current, and a motor voltage, i.e., an output voltage of the inverter, is detected various motor constants are identified from the relation between the predetermined motor current reference and the detected motor voltage, and the control constants in the control apparatus are set in accordance with the identified motor constants.

In the prior art mentioned above, however, there must be provided a particular voltage detector, which is exclusively used only for obtaining the motor constants. Further, since the voltage detected by the voltage detector usually has a distorted waveform, it is detected with a low accuracy, with result that the accuracy of the determination of the control constants also becomes low.

SUMMARY OF THE INVENTION

An object of the present invention is to provide a control apparatus for an inverter which conducts a vector control of an inverter-driven induction motor, and which is able to accurately measure motor constants of the induction motor, without adding any particular detector, by operating the inverter under a certain condition and automatically set or adjust control constants necessary for calculating voltage references for the vector control.

In a control apparatus to which the present invention is applied, there are provided a first and second voltage references necessary for the vector control of an inverter-driven induction motor in accordance with a predetermined relation set in the control apparatus in advance on the basis of a magnetizing current reference and a torque current reference. Each of the voltage references is given in the form of a componentof a voltage vector in a d-q coordinate system which is a rectangular coordinates rotated in synchronism wihh a rotating magnetic field of the induction motor, i.e., the first voltage reference being a component in one coordinate axis of the d-q coordinate system and the second one a component in the other coordinate axis thereof. Also, the magnetizing current reference is given in the form of a component in the one coordinate axis of a current vector in the d-q coordinate system, and the torque current reference in the form of a component in the other coordinate axis thereof.

According to a feature of the present invention, a motor current flowing through the induction motor is detected when voltage is applied to the induction motor by the inverter operated under a certain condition, the detected current is converted to two components of a current vector in the d-q coordinate system, motor constants are calculated on the basis of the first and second voltage references set for the certain condition and the two converted components of the motor current detected at that time, and control constants in the predetermined relation set in the control apparatus are set or adjusted in accordance with the calculated motor constants.

BRIEF DESCRIPTION OF THE DRAWINGS

FIG. 2 is a flow chart illustrating whole steps of the processing operation of the control apparatus shown in FIG. 1;

FIG. 3 is a flow chart showing in further details a step of measuring motor constants included in the flow of FIG. 2;

FIG. 4 is a flow chart showing in further details a processing of calculating $r_1 + r_2'$, which is one of steps of the flow of FIG. 3;

FIG. 5 is a flow chart illustrating a processing of obtaining $r_1$ and $r_2'$, which is included as a part of the flow of FIG. 3;

FIG. 6 is a flow chart illustrating a processing of obtaining $l_1 + L_1$ and $T_2$, which is included as a part of the flow of FIG. 3;

DESCRIPTION OF THE PREFERRED EMBODIMENTS

In the following a preferred embodiment of the present invention will be explained with reference to the drawings. Preceding the description of the embodiment, listed below are symbols used in the following explanation.

Constants of an induction motor $r_1$: primary resistance;
$l_1$: primary leakage inductance;
$L_1$: primary effective inductance;
$r_2$, $r_2'$: secondary resistance, and that in terms of the primary side;
$l_2$, $l_2'$: secondary leakage inductance, and that in terms of the primary side;
$L_2$, $L_2'$: secondary effective inductance, and that in terms of the primary side;
$M$: mutual inductance; and
$T_2$: time constant of the secondary side

Quantities $v_{1d}^*$, $v_{1q}^*$ primary voltage references represented in the form $v_{1q}^*$ of components of a voltage vector in a d-q coordinate system which is a rectangular coordinates rotated in synchronism with a rotating magnetic field of an induction motor; $v_{1d}^*$ is the component in a d-coordinate axis and $v_{1q}^*$ is that in a q-coordinate axis;

$v_{1d}, v_{1q}$: primary voltages represented in the same manner as described above;

$v_1$, $v_1^*$: three phase AC voltage outputted by an inverter, i.e., primary voltage of an induction motor, and its reference; reference voltage of each phase U, V, W is represented by $v_U^*$, $v_V^*$ and $v_W^*$;

$i_1$: three phase AC current flowing through the primary side of an induction motor; current of each phase U, V, W is represented by $i_U$, $i_V$ and $i_W$;

$i_1\alpha$, $i_1\beta$: primary currents represented as components of a current vector in an $\alpha$-$\beta$ coordinate system which is a stationary rectangular coordinates;

$i_{1d}^*$, $i_{1q}^*$: primary current references represented in the form of components of a current vector in the d-q coordinate system; $i_{1d}^*$ is the component in the d-coordinate axis and usually called a magnetizing current reference, and $i_{1q}^*$ is that in the q-coordinate axis and called a torque current reference;

$i_{1d}$, $i_{1q}$: primary currents represented in the same manner as described above;

$i_{2d}$, $i_{2q}$: secondary currents represented in the same manner as described above;

$\omega_1$, $\omega_1^*$: frequency of output voltage of an inverter, and its reference;

$\omega_r$, $\omega_r^*$: speed signal of an induction motor and its instruction represented by the angular frequency; and $\omega_s$, $\omega_s^*$: slip frequency and its reference.

Figure 1:
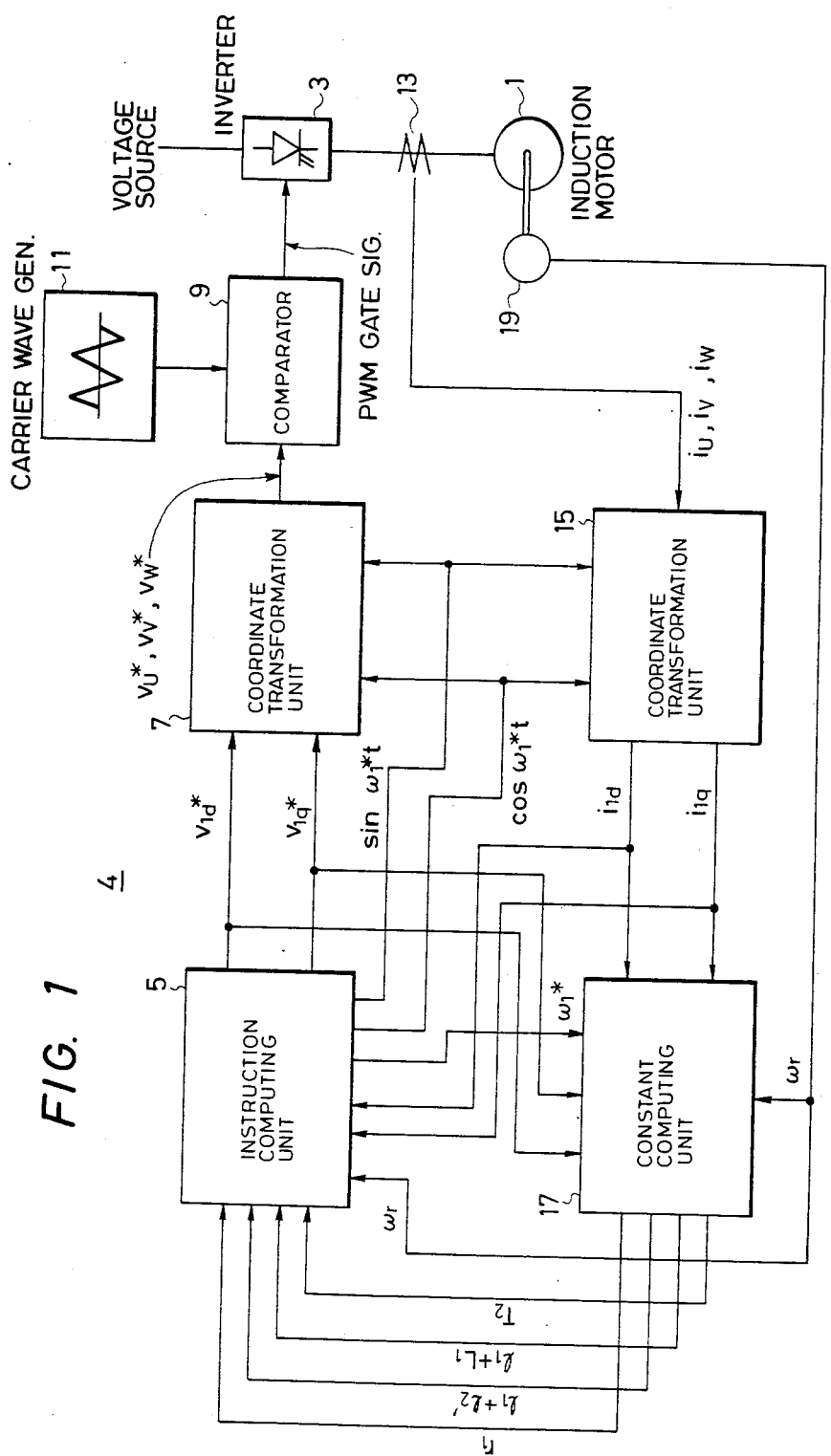
FIG. 1 is a block diagram schematically showing a control apparatus for an inverter according to an embodiment of the present invention.

Referring now to FIG. 1, in which an embodiment of the present invention is schematically shown, a squirrel cage induction motor 1 is fed from a voltage source with variable AC voltage of variable frequencies, which is obtained by an inverter 3. The inverter 3 is controlled by a control apparatus generally indicated by a reference numeral 4 on the basis of a so called pulse width modulation (PWM) control.

In the control apparatus 4, although described in detail later, an instruction computing unit 5 produces the voltage reference signals $v_{1d}^*$, $v_{1q}^*$ and phase reference signals $\sin \omega_1^* \cdot t$, $\cos \omega_1^* \cdot t$. As is well known, a coordinate transformation unit 7 carries out a vector rotation and a two-to-three phase conversion, whereby the voltage references $v_{1d}^*$, $v_{1q}^*$ are at first converted into two phase quantities in the $\alpha$-$\beta$ coordinate system by the vector rotation, and then the thus obtained two-phase quantities are transformed to three phase voltage references $v_U^*$, $v_V^*$, $v_W^*$ by the two-to-three phase conversion by using the phase reference signals $\sin \omega_1^* \cdot t$, $\cos \omega_1^* \cdot t$. The relation between the voltage references $v_{1d}^*$, $v_{1q}^*$ and the three phase voltage references $v_U^*$, $v_V^*$, $v_W^*$ will be described in detail later.

In a comparator 9, the three phase voltage references $v_U^*$, $v_V^*$, $v_W^*$ are compared with a triangular carrier wave generated by a carrie wave generator 11 to produce PWM gate pulses, according to which the output voltage $v_1$ of the inverter 3 is controlled based on the PWM control. As a result, the instantaneous value of a fundamental component of the output voltage of the inverter 3 is in proportion to the voltage references $v_U^*$, $v_V^*$, $v_W^*$.

The three phase currents $i_U$, $i_V$, $i_W$ of the motor 1 are detected by a current detector 13. The detected three phase crrrents $i_U$, $i_V$, $i_W$ are transformed to quantities $i_{1d}$, $i_{1q}$ in the d-q coordinate system by a coordinate transformation unit 15, on the basis of the phase reference signals $\sin\omega_1^* \cdot t$, $\cos\omega_1^* \cdot t$ taken thereinto. The coordinate transformation unit 15 carries out a three-to-two phase conversion and the vector rotation. Although this coordinate transformation is well known, too, the relation between the detected three phase currents $i_U$, $i_V$, $i_W$ and the two-phase currents $i_{1d}$, $i_{1q}$ will be described in detail later.

An arrangement described above is almost similar to that of a conventional control apparatus, by which the vector control of an induction motor is carried out by using a PWM-controlled inverter. According to the embodiment of the present invention, a constant computing unit 17 is provided, which measures various constants of the motor 1, such as the primary resistance $r_1$, a leakage inductance $l_1 + l_2'$, a primary inductance $l_1 + L_1$, the time constant $T_2$ and so on.

In the constant computing unit 17, those motor constants are obtained by the calculation, in which there are utilized the voltage references $v_{1d}^*$, $v_{1q}^*$, the frequency reference $\omega_1^*$ of the output voltage of the inverter 3 from the instruction computing unit 5 as well as the detected current signals $i_{1d}$, $i_{1q}$ from the coordinate transformation unit 15, and, if a speed detector 19 is attached to the motor 1, the speed signal $\omega_r$ therefrom. However, the necessity of the speed signal $\omega_r$ depends on the architecture of the instruction computing unit 5, and therefore the existence of the speed detector 19 is not always essential to the present invention.

Further, in FIG. 1, the control apparatus 4 is shown as being constructed with various kinds of independent and separate units or devices, in order to facilitate the understanding of the present invention. However, the control apparatus 4 can be of course realized by a microprocessor which is programed so as to execute the operations or functions equivalent to those performed by the unit or devices as shown.

Now, before entering the description of the operation of the present embodiment, the operational principle thereof will be explained.

At first, the voltage references $v_{1d}^*$, $v_{1q}^*$ are produced in the instruction computing unit 5. The architecture in this unit 5 will be explained later with reference to FIGS. 7 and 8, in which examples of the application of the present invention are shown. Briefly, however, they are produced in accordance with the predetermined relation set in the instruction computing unit 5 on the basis of the magnetizing current reference and the torque current reference.

Using the phase references $\sin \omega_1^* \cdot t$, $\cos \omega_1^* \cdot t$, which are generated in the instruction computing unit 5, the coordinate transformation unit 7 converts the voltage references $v_{1d}^*$, $v_{1q}^*$ to the three phase voltage reference $v_1^*$ (i.e., $v_U^*$, $v_V^*$, $v_W^*$) in accordance with the following formulas;

$$v_U^* = V\cos(\omega_1^* \cdot t + \theta) \tag{1}$$
$$v_V^* = V\cos(\omega_1^* \cdot t - 2\pi/3 + \theta)$$
$$v_W^* = V\cos(\omega_1^* \cdot t + 2\pi/3 + \theta)$$

$$\text{wherein } V = \sqrt{v_{1d}^{*2} + v_{1q}^{*2}} \tag{2}$$

$$\theta = \tan^{-1}\frac{v_{1q}^*}{v_{1d}^*} \tag{3}$$

On the other hand, the primary currents $i_{1d}$, $i_{1q}$ of the motor 1 are obtained by the coordinate transformation unit 15 in accordance with the following formula on the basis of the currents $i_U$, $i_V$, $i_W$ detected by the current detector 13;

$$\begin{vmatrix} i_{1d} \\ i_{1q} \end{vmatrix} = \begin{vmatrix} \cos 1^* \cdot t & \sin 1^* \cdot t \\ -\sin 1^* \cdot t & \cos 1^* \cdot t \end{vmatrix} \begin{vmatrix} i_{1\alpha} \\ i_{1\beta} \end{vmatrix} \tag{4}$$

$$\text{wherein } i_{1\alpha} = i_U$$

$$i_{1\beta} = \frac{1}{\sqrt{3}}(i_V - i_W)$$

By the way, in the case of the PWM-controlled inverter, the primary current of a motor has less distortion and is very close to the sinusoidal wave, so that the current $i_{1d}$, $i_{1q}$ can be obtained with the high accuracy in accordance with the formula (4).

Voltage equations of an induction motor in the steady state can be given by using voltages and currents represented as the quantities in the d-q coordinate system as follows;

$$v_{1d} = r_1 \cdot i_{1d} - \omega_1(l_1 + L_1)i_{1q} - \omega_1 M \cdot i_{2q} \tag{5}$$

$$v_{1q} = \omega_1(l_1 + L_1)i_{1d} + r_1 \cdot i_{1q} + \omega_1 M \cdot i_{2d} \tag{6}$$

Since the secondary current can not be detected in a squirrel cage induction motor, variables $i_{2d}$, $i_{2q}$ are necessary to be eliminated from the aforesaid formulas for the following processing. The relation between a primary current and a secondary one is represented as follows, based on a voltage equation of a secondary circuit of a rotor of the motor 1;

$$\omega_s M \cdot i_{1q} = r_2 \cdot i_{2d} - \omega_s(l_2 + L_2)i_{2q} \tag{7}$$

$$-\omega_s M \cdot i_{1d} = \omega_s(l_2 + L_2)i_{2d} + r_2 \cdot i_{2q} \tag{8}$$

If $i_{2d}$, $i_{2q}$ in the formulas (5), (6) are eliminated by using the formulas (7), (8), $v_{1d}$, $v_{1q}$ become as follows:

$$v_{1d} = \left\{ r_1 + \frac{\omega_1 \omega_s M^2 r_2}{r_2^2 + s^2(l_2 + L_2)^2} \right\} i_{1d} + \tag{9}$$
$$\left\{ -\omega_1(l_1 + L_1) + \frac{\omega_1 \omega_s^2 M^2(l_2 + L_2)}{r_2^2 + \omega_s^2(l_2 + L_2)^2} \right\} i_{1q}$$

$$v_{1q} = \left\{ \omega_1(l_1 + L_1) - \frac{\omega_1 \omega_s^2 M^2(l_2 + L_2)}{r_2^2 + \omega_s^2(l_2 + L_2)^2} \right\} i_{1d} + \tag{10}$$
$$\left\{ r_1 + \frac{\omega_1 \omega_s M^2 r_2}{r_2^2 + \omega_s^2(l_2 + L_2)^2} \right\} i_{1q}$$

The various motor constants are obtained on the basis of the above mentioned formulas (9), (10). In the following, the description will be made of the measurement of the individual motor constants.

Measurement of $r_1 + r_2'$ and $l_1 + l_2'$

These motor constants are obtained as follows. The voltage reference $v_{1d}^*$ is set at a predetermined value, and the voltage reference $v_{1q}^*$ is fixed at zero. The value of $v_{1d}^*$ must be selected at such a value that the motor 1 does not start to rotate. In view of the accuracy of measurement of the motor constants, however, it is desirable to be set as large as possible. It can be set about 20 to 30 per cent of the rated value thereof, for example. The frequency of the output voltage of the inverter 3 is set at a predetermined value $\omega_1^*$. Further, since the motor 1 is kept at a standstill, slip of the motor 1 becomes one, so that the slip frequency $w_s$ is nearly equal to $\omega_1$. If the set value $\omega_1^*$ of the frequency is large to a certain extent, e.g., about commercial frequency, the relation of $r_2^2 << \omega 1^2(l_2+L_2)^2$ can be established. Under these conditions, the formulas (9), (10) become as follows:

$$v_{1d}^* = \left\{ r_1 + \left(\frac{M}{l_2 + L_2}\right)^2 r_2 \right\} i_{1d} - \tag{11}$$
$$\omega_1^* \left\{ l_1 + \frac{M}{l_2 + L_2} l_2 \right\} i_{1q}$$
$$\approx (r_1 + r_2') i_{1d} - {}_1(l_1 + l_2') i_{1q}$$

$$0 \approx \omega_1^*(l_1 + l_2') i_{1d} + (r_1 + r_2') i_{1q} \tag{12}$$

Therefore, $$r_1 + r_2' = \frac{i_{1d}}{i_{1d}^2 + i_{1q}^2} v_{1d}^* \tag{13}$$

$$l_1 + l_2' = -\frac{1}{\omega_1^*} \cdot \frac{i_{1q}}{i_{1d}^2 + i_{1q}^2} v_{1d}^* \tag{14}$$

The formulas (13), (14) mean that the resistance $r_1 + r_2'$ of the motor 1 can be calculated on the basis of the voltage reference $v_{1d}^*$ in the d-coordinate axis and the detected currents $i_{1d}$, $i_{1q}$, i.e., the components in the d-q coordinates and that the inductance $l_1 + l_2'$ of the motor 1 can be calculated on the basis of the voltage reference $v_{1d}^*$ in the d-coordinate axis and the detected currents $i_{1q}$, $i_{1q}$ i.e., the components in the d-q-coordinates axis.

As apparent from the aforesaid formulas, the thus obtained resistance and the leakage inductance are of combined values of those of the primary side and those of the secondary side in terms of the primary side Especially, with respect to the resistance, the separated values $r_1$, $r_2$ are required.

Measurement of $r_1$ and $r_2'$

In this case, the condition is set such that a DC voltage is applied to the motor 1, i.e., the frequency of the output of the inverter 3 is set at zero ($\omega_1^* = 0$). Other conditions are the same as those in the measurement of $r_1 + r_2'$ and $l_1 + l_2'$ as mentioned above. Under these conditions, voltage of each phase applied to the motor 1 is given in accordance with the formulas (1) to (3), as follows;

$$v_U^* = v_{1d}^*, \quad v_V^* = v_W^* = -v_{1d}^*/2$$

Caused by the application of such voltages, the current flows through the motor 1, and the current detected at that time becomes, from the formula (4), as follows;

$$i_{1d} = i_U, \quad i_{1q} = 0 \qquad (16)$$

Accordingly, the primary resistance per one phase can be obtained in accordance with the following formular on the basis of the voltage reference $v_{1d}^*$ and the detected current $i_{1d}$, both being the components in the d-coordinate axis;

$$r_1 = v_{1d}^*/i_{1d} \qquad (17)$$

The secondary resistance $r_2'$ in terms of the primary side can be get by subtracting the primary resistance $r_1$ obtained as above from the result obtained by the formula (13).

Measurement of $l_1 + L_1$

For the measurement of the primary inductance $l_1 + L_1$ of the motor 1, the following conditions are set; $v_{1d}^* = 0$, $v_{1q}^* =$ predetermined value proportional to $\omega_1^*$ and $\omega_s = 0$. According to these conditions, the motor 1 is operated under no load, while a so called voltage/frequency ratio is maintained at the rated value. The current $i_{1q}$ is zero because of the no load condition, and therefore the leakage inductance $l_1 + L_1$ can be obtained from the formula (10) as follows;

$$l_1 + L_1 = \frac{v_{1q}^*}{\omega_1^* i_{1d}} \qquad (18)$$

Measurement of $T_2$

The time constant $T_2$ of the secondary side of the motor 1 is given by the following formula;

$$T_2 = \frac{l_2 + L_2}{r_2} = \frac{l_2' + L_2'}{r_2'} \qquad (19)$$

In the above formula, the secondary resistance $r_2'$ in terms of the primary side can be obtained by the formulas (13), (17), and the secondary leakage inductance $l_2' + L_2'$ in terms of the primary side can almost be given by the following formula;

$$l_2' + L_2' = \frac{L_1}{L_2}(l_2 + L_2)$$
$$= L_1 + \frac{L_1}{L_2} l_2 = L_1 + l_2'$$

Wherein the primary leakage inductance $l_1$ and the secondary leakage inductance $l_2'$ in terms of the primary side can not be detected separately. Since, however, they are generally designed at almost the same value, large error does not occur even if $l_2'$ is treated as being equal to $l_2$. Accordingly, the secondary leakage inductance $l_2' + L_2'$ in terms of the primary side can be expressed as follows;

$$l_2' + L_2' = l_1 + L_1 \qquad (20)$$

Therefore, the time constant $T_2$ can be obtained by dividing the result of the formula (18) by $r_2'$.

In the foregoing, the principle of the measurement of the motor constants has been described. As already mentioned, a series of processing operations, i.e., the abovesaid measurement, the setting of hhe control constants in the control apparatus in accordance with the measurement result and the processing for the vector control, are accomplished by a so programed microprocessor. In the following, therefore, the content of the processing operations by the microprocessor will be explained with reference to FIGS. 2 to 6 which show the flow charts of the processing operations.

FIG. 2 is a flow chart showing the total operation executed by a microprocessor which is included in the control apparatus 4 as a main part. Namely, after start of the operation, it is discriminated at step 21 whether or not the motor constants have been already obtained. The measurement of the motor constants are sufficient to be conducted once when the control apparatus is first combined with a particular motor. However, the renewal of the motor constants should be conducted when it becomes necessary becaus of the aged deterioration of the motor or some reasons, for example. Once the motor constants are obtained, they are held in an appropriate storage in the microprocessor, and a flag is raised. If, therefore, it is discriminated at step 21 that the flag is raised, the processing operation is jumped to step 24, at which the processing for the vector control is carried out.

If the motor constants have not been obtained yet, the processing operation goes to step 22, at which the motor constants are calculated in accordance with the principle mentioned already and stored in the storage. This step is essential to the present invention and therefore will be explained further in detail later, referring to FIG. 3 et seq. At step 23, the stored motor constants are read out, and the control constants in the control apparatus are set or adjusted on the basis of the read-out motor constants. After that, the processing for the vector control is executed at step 24. On the basis of the result of the processing at step 24, the inverter 3, and hence the motor 1 is controlled.

As shown in FIG. 3, step 22 of FIG. 2, at which the motor constants are obtained, is further divided into three processing modes. Namely, the resistance $r_1 + r_2'$ and the leakage inductance $l_1 + l_2'$ are calculated at step 31, and then the primary resistance $r_1$ at step 32 and the primary effective inductance $l_1 + L_1$ at step 33.

It is to be noted here that it depends on the architecture of the instruction computing unit 5 what kind of the motor constants should be obtained, and therefore the choice of the whole or the parts of the steps in FIG. 3 is determined by it. However, the explanation here will be made of the whole thereof in relation to the examples of the application of the present invention described later, in which the instruction computing unit 5 uses all of the aforesaid motor constants.

Details of step 31 is shown in FIG. 4. In the figure, at step 41ω, and $v_{1d}*$ are set at predetermined values and $v_{1q}*$ is fixed at zero. It will be understood that this condition is the same as that described in the explanation of the principle of the measurement of $r_1+r_2'$ and $l_1+l_2'$. After setting the condition as mentioned above, voltage is applied to the motor 1 through the inverter 3. At this time, since $v_{1d}*$ is small and therefore the produced torque is also small, the motor 1 is kept stopping so that the relation of $\omega_s=\omega_1$ is maintained.

As the result of the application of voltage to the motor according to the above mentioned condition, the motor currents flows, which is detected by the detector 13 and read as $i_{1d}$, $i_{1q}$ at step 42. Thereafter, $r_1+r_2'$ and $l_1+l_2'$ are calculated in accordance with the formulas (13), (14) on the basis of the read $i_{1d}$, $i_{1q}$ and the set voltage reference $v_{1d}*$, at steps 43, 44 respectively.

Next, $r_1$ and $r_2'$ are obtained at step 32, details of which is shown in FIG. 5. At first, at step 51, $v_{1d}*$ is set at a predetermined value, $v_{1q}*$ and $\omega_1*$ are fixed at zero, and then voltage is applied to the motor 1 through the inverter 3 under the aforesaid condition. To fix $\omega_1*$ at zero means that DC voltage is output by the inverter 3 and applied to the motor 1. Among the components of the current flowing through the motor 1 as the result of the application of such voltage, only $i_d$ is read at step 52. At step 53, $r_1$ is calculated in accordance with the formula (17) on the basis of the read ild and the set voltage reference $v_{1d}*$, and then, at step 54, $r_2'$ is calculated by using the result ($r_1+r_2'$) of step 43 in FIG. 4 in accordance with the relation ($r_1+r_2'$)-$r_1$.

Finally, at step 33 in FIG. 3, details of which are shown in FIG. 6, $l_1+L_1$ and $T_2$ are calculated. At step 61, the motor 1 is operated, $\omega_1*$ and $v_{1q}*$ being set at rated values thereof. Further, in order to prevent the rush current during the start of the motor 1, $\omega_1*$ and $v_{1q}*$ are increased, while maintained at a constant ratio thereof, and made to reach up to the rated values thereof. After $\omega_1*$ and $v_{1q}*$ have been reached to their rated values, $i_{1d}$, $i_{1q}$ are read at step 62. At step 63, $l_1+L_1$ is calculated in accordance with the formula (18) on the basis of the read $i_{1d}$, $i_{1q}$ and the set $\omega_1*$, $v_{1q}*$, and then at step 64, $T_2$ is calculated in accordance with the formula (19) on the basis of $l_1+L_1$ calculated at step 63 and $r_2'$ already obtained at step 54 of FIG. 5.

Returning to FIG. 2, the thus obtained various kinds of the motor constants are once stored in the storage, which are read out in order to set the control constants in the control apparatus at step 23. After the set of the control constants in accordance with the read out motor constants, the processing operation for the vector control is executed at step 24. On the basis of the result of step 24, the inverter 3, and therefore the motor 1 is controlled.

Figure 7:
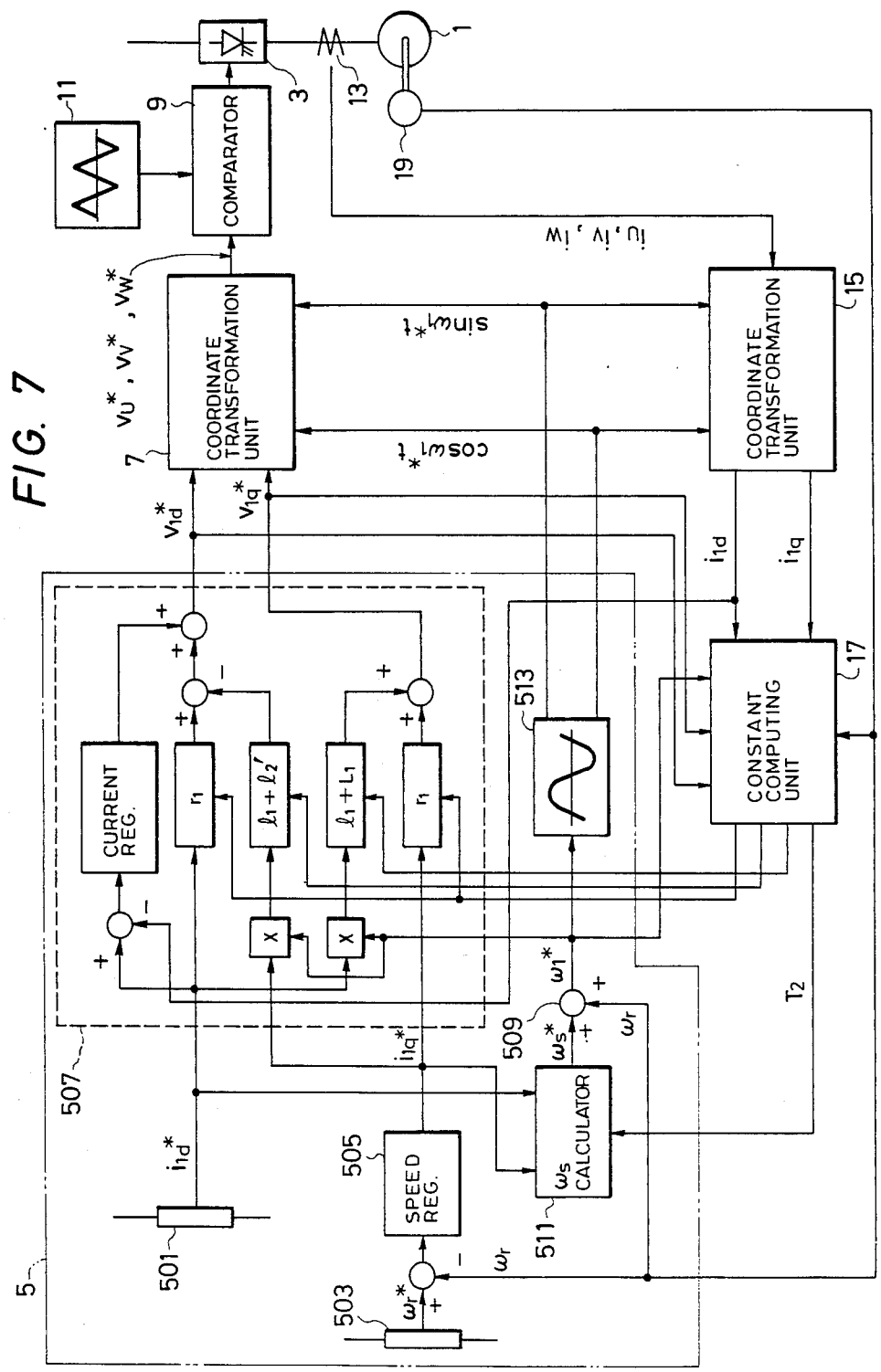
FIG. 7 is a block diagram showing an example of the application of the present invention.

Referring next to FIG. 7, an example of the application of the present invention will be explained in the following. The same reference numerals indicate the same units or devices as in FIG. 1. Further, since the above mentioned example of the application is relates to the way how the obtained motor constants are used in the processing operation for the vector control, there is shown the instruction computing unit 5 particularly in detail.

In the instruction computing unit 5 shown in FIG. 7, the primary current reference $i_{1d}*$ and the speed reference $\omega_r*$ are given by an exciting current instructor 501 and a speed instructor 503, respectively. The current reference $i_{1d}*$ is so set that the amount of flux ($L_1 \cdot i_{1d}*$) of the motor becomes a predetermined value, i.e., the predetermined ratio of the primary voltage to the frequency thereof is maintained. Therefore, $i_{1d}*$ will be called a magnetizing current reference, hereinafter. The current reference $i_{1q}*$ is obtained by a speed regulator 505 in accordance with the deviation between the speed reference $\omega_r*$ and the motor speed $\omega_r$ detected by the speed detector 19. Therefore, $i_{1q}*$ will be called a torque current reference, hereinafter.

On the basis of the thus set or obtained $i_{1d}*$ and $i_{1q}*$, the voltage references $v_{1d}*$, $v_{1q}*$ are calculated in a reference calculator 507 in accordance with the following formulas;

$$v_{1d}* = r_1 \cdot i_{1d}* - \omega(l_1+l_2')i_{1q}* \qquad (21)$$

$$v_{1q}* = \omega_1*(l_1+L_1)i_{1d}* + r_1 \cdot i_{1q}* \qquad (22)$$

As the motor constants $r_1$, $l_1+l_2'$ and $l_1+L_1$ included in the above formulas, those calculated by the constant computing unit 17 are used. Further, $\omega_1*$ is obtained by a adder 509 as the summation of the slip frequency $\omega_s*$ and the speed signal $\omega_r$ detected by the speed detector 19. The slip frequency $\omega_s*$ can be calculated by a slip frequency ($\omega_s$) calculator 511 in accordance with the following formula on the basis of $i_{1d}*$, $i_{1q}*$, mentioned above;

$$\omega_s* = \frac{1}{T_2} \cdot \frac{i_{1q}*}{i_{1d}*} \qquad (23)$$

wherein the time constant $T_2$ of the second side of the motor 1 is given by the constant computing unit 17.

Since a portion surrounded by a broken line as the reference calculator 507 is only embodied in accordance with the formulas (21), (22), the further description is omitted. Further, a current regulator in the reference calculator 507 functions for making the current component $i_{1d}$ follow $i_{1d}*$.

Further, the output $\omega_1*$ of the adder 509 is led to an oscillator 513, in which the two phase signals sin $\omega_1* \cdot t$, cos $\omega_1* \cdot t$ are produced on the basis of $\omega_1*$.

As above mentioned, the control constants used for calculating the voltage references $v_{1d}*$, $v_{1q}*$ for the vector control in the instruction computing unit 5 are automatically provided from the constant computing unit 17 by the preparatory operation already described.

Figure 8:
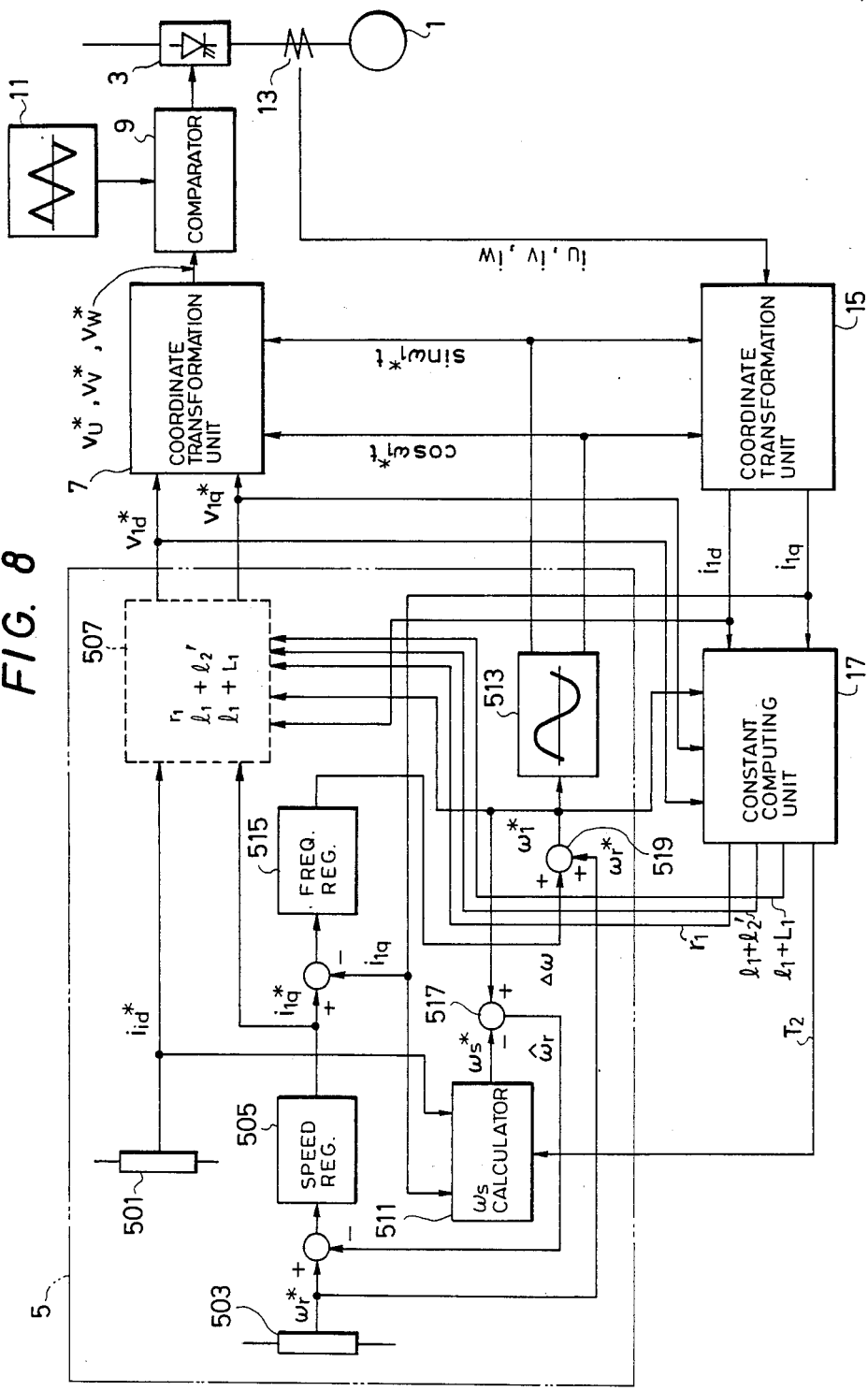
FIG. 8 is a block diagram showing another example of the application of the present invention.

In FIG. 8 there is shown another example of the application of the present invention. As apparent from the figure, the speed detector 19 is omitted in this example. Instead thereof, the speed signal $\omega_r$ is estimated by the calculation, which is indicated as $\hat{\omega}_r$ in the figure.

Namely, $\Delta\omega$ is at first obtained by a frequency regulator 515 on the basis of the difference between the current reference $i_{1q}*$ and the detected current $i_{1q}$. The thus obtained $\Delta\omega$ depends on the slip frequency of the motor 1. Then, the frequency reference $\omega_1*$ is obtained by adding $\Delta\omega$ to the set speed signal $\omega_r*$ in an adder 519. The estimated speed signal $\hat{\omega}_r$ is obtained by subtracting the slip frquency reference $\omega_s*$ obtained in the $\omega_s$ calculator 511 from the frequency reference ω₁* obtained in the adder 519 in a subtracter 517.

In the remaining points, the application example of FIG. 8 is the same that of FIG. 7. Therefore, the control constants used for the calculating the voltage references $v_{1d}^*$, $v_{1q}^*$ for the vector control in the instruction computing unit 5 can be automatically set on the basis of the result obtained by the constant computing unit 17 through the preparatory operation.

Although there have been herein shown and described only a few forms of apparatus embodying the present invention, it is understood that various changes and modifications may be made therein within the scope of the appended claims without departing from the spirit and scope of the present invention.

We claim:

1. A control apparatus for an inverter, which feeds an induction motor with output AC voltage of variable voltage magnitude and variable frequencies, which output voltage is obtained by converting AC voltage supplied by an AC voltage source on the basis of a vector control, comprising:

current detecting means for detecting a primary current flowing through the induction motor;

inverter gate control means responsive to an output voltage reference signal for producing gate signals for operating the inverter to control the output AC voltage thereof; for first coordinate transformation means producing the output voltage reference signal by converting an excitation voltage component reference and a torque voltage component reference by means of a coordinate transformation, in which there are used phase references depending on a frequency reference of said output AC voltage of the inverter;

second coordinate transformation means for producing an excitation current component and a torque current component by converting a primary current detected by said current detecting means by means of a coordinate transformation, in which said phase references are used;

instruction computing means for producing the references for the excitation voltage component and the torque voltage component and the phase references on the basis of at least one of the excitation current component and the torque current component of the detected primary current and instructions for the excitation current component and a speed of the induction motor, by using motor constants of the induction motor provided in advance therein; and constant determining means for calculating the motor constants on the basis of the primary current detected under the condition for a preliminary testing operation of the induction motor that the voltage reference for the excitation component and the torque component, the frequency of the output AC voltage of the inverter add the slip frequency of the induction motor are maintained at desired values necessary for calculating the respective motor constants and readjusting the motor constants provided in said instruction computing means on the basis of the calculation result.

2. A control apparatus for an inverter according to claim 1, wherein said instruction computing means produces the references for the excitation voltage component ($v_{1d}$) and the torque voltage component ($v_{1q}$) in accordance with the following relation on the basis of the excitation current component ($i_{1d}$) and the torque current component ($i_{1q}$) of the detected primary current;

$$v_{1d} = \left( r_1 + \frac{\omega_1 \omega_s M^2 r_2}{r_2^2 + \omega_s^2 (l_2 + L_2)^2} \right) i_{1d} + \left( -\omega_1(l_1 + L_1) + \frac{\omega_1 \omega_s^2 M^2 (l_2 + L_2)^2}{r_2^2 + \omega_s^2 (l_2 + L_2)^2} \right) i_{1q}$$

$$v_{1q} = \left( \omega_1(l_1 + L_1) - \frac{\omega_1 \omega_s^2 M^2 (l_2 + L_2)^2}{r_2^2 + \omega_s^2 (l_2 + L_2)^2} \right) i_{1d} + \left( r_1 + \frac{\omega_1 \omega_s M^2 r_2}{r_2^2 + \omega_s^2 (l_2 + L_2)^2} \right) i_{1q}$$

wherein
$r_1$: primary resistance of the induction motor;
$r_2$: secondary resistance thereof;
$l_1$: primary leakage inductance thereof;
$L_1$: primary effective inductance thereof;
$l_2$: secondary leakage inductance thereof;
$L_2$: secondary effective inductance thereof;
$M$: mutual inductance thereof;
$\omega_1$: frequency of the output voltage of the inverter; and
$\omega_s$: slip frequency.

3. A control apparatus for an inverter according to claim 2, wherein said current detecting means further detects the primary current, when the inverter is operated under the condition for the preliminary testing operation of the induction motor that the excitation voltage component reference and the frequency reference are set at predetermined values, respectively and the torque voltage component reference is fixed at zero, and said constant determining means calculates a resistance of the induction motor on the basis of the excitation voltage component reference and at least one of the excitation current component and the torque current component of the detected primary current and a leakage inductance of the induction motor on the basis of the excitation voltage component reference and the other current component of the detected primary current.

4. A control apparatus for an inverter according to claim 3, wherein said current detecting means further detects the primary current, when the inverter is operated under the condition for the preliminary testing operation of the induction motor that the excitation voltage component reference is set at a predetermined value, and the torque voltage component reference and the frequency reference are fixed at zero, respectively, and said constant determining means calculates a resistance on a primary side of the induction motor on the basis of the excitation voltage component reference and the excitation current component of the detected primary current and a resistance on a secondary side thereof in terms of the primary side as a difference between the resistance of the induction motor and the resistance on the primary side thereof.

5. A control apparatus for an inverter according to claim 4, wherein said current detecting means further detects the primary current, when the inverter is operated under no load on the basis of a predetermined ratio of the torque voltage component reference to the frequency reference, and said constant determining means calculates an inductance on the primary side of the induction motor in accordance with the predetermined ratio of the torque voltage component reference to the frequency reference and the torque current component of the detected primary current.

6. A control apparatus for an inverter according to claim 5, wherein said constant determining means further calculates a time constant on the secondary side of the induction motor from the inductance on the primary side thereof and the resistance on the secondary side in terms of the primary side.

* * * * *